United States Patent
Herbert

[15] 3,690,721
[45] Sept. 12, 1972

[54] PROTECTIVE WINDSHIELD

[72] Inventor: Donald C. Herbert, 23425 Colonial Court, St. Clair Shores, Mich. 48080

[22] Filed: Nov. 12, 1970

[21] Appl. No.: 88,619

[52] U.S. Cl..................................296/78.1, 280/289
[51] Int. Cl. ..............................................B62h 17/04
[58] Field of Search ..........280/289; 296/78.1, 84, 90

[56] References Cited

UNITED STATES PATENTS 2,589,993  3/1952  Comiskey.................296/78.1
3,586,348  6/1971  Rich..........................280/289

FOREIGN PATENTS OR APPLICATIONS 1,264,593  5/1961  France.....................296/78.1
1,064,803  5/1954  France.....................296/78.1
  979,320  12/1950 France.....................296/78.1

Primary Examiner—Kenneth H. Betts
Attorney—Whittemore, Hulbert & Belknap

[57] ABSTRACT

A protective windshield for a bicycle or the like, having clamps for removably mounting it on the handle bar. The upper portion of the shield is transparent and the lower portion is reflectorized and/or luminescent.

8 Claims, 4 Drawing Figures

Patented Sept. 12, 1972 3,690,721
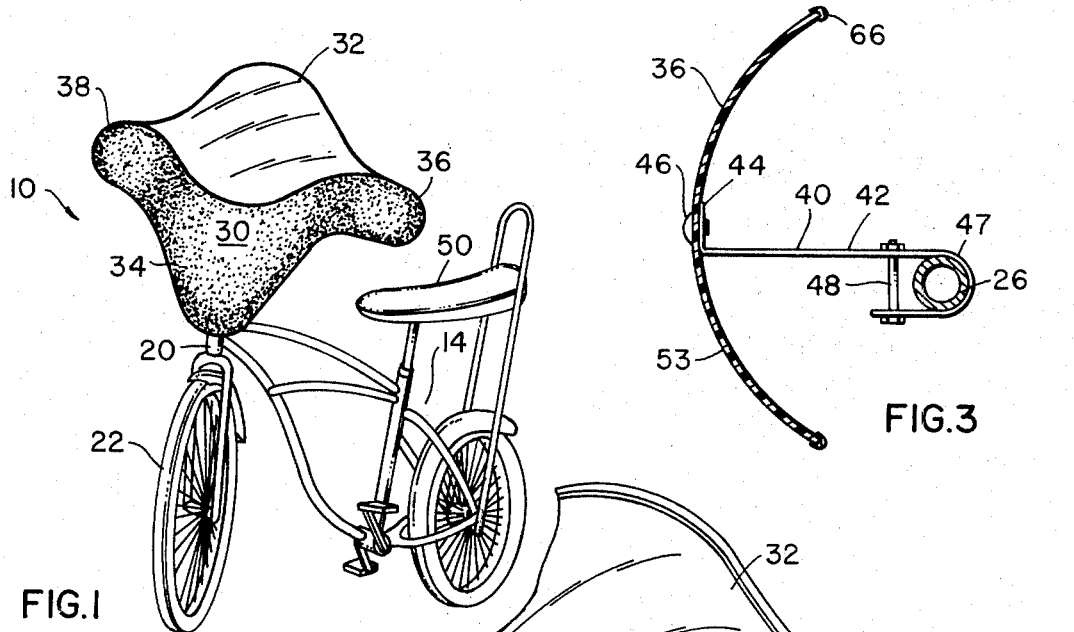
FIG.1
FIG.3
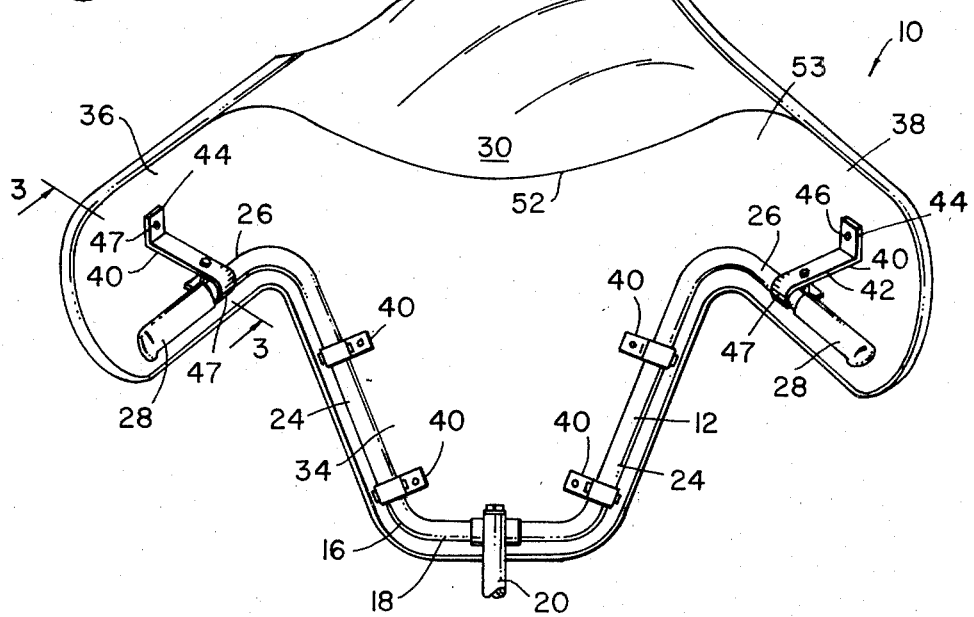
FIG.2
FIG.4
INVENTOR
DONALD C. HERBERT
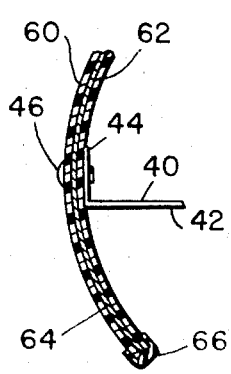
BY
ATTORNEYS 3,690,721

PROTECTIVE WINDSHIELD

SUMMARY OF THE INVENTION

One object of this invention is to provide an improved protective windshield for a bicycle or the like which is tough and strong enough to protect the rider in the event of a fall and at least a portion of which is transparent for maximum visibility.

Another object is to provide a protective windshield in which the lower portion is reflectorized to reflect the lights of an approaching vehicle.

Another object is to provide a protective windshield in which the lower portion is luminescent.

Another object is to provide a protective windshield which is of a shape and dimension to fully protect the rider from wind and from impact which might be occasioned by flying objects or as the result of a fall.

Another object is to provide a protective windshield having a central main body portion extending from the mid-portion of the handle bar up above the head level of a rider seated on the bicycle, and also having laterally extending portions along the hand grip portions of the handle bar.

Another object is to provide a windshield in which the lower portion is covered, preferably on the back side, with light reflecting and/or luminescent material.

Another object is to provide a windshield formed of transparent laminations and in which the light reflecting and/or luminescent material is between the laminations.

Other objects and features of the invention will become apparent as the description proceeds, especially when taken in conjunction with the accompanying drawing wherein:

FIG. 1 is a perspective view of a bicycle shown with the windshield of my invention mounted thereon.

FIG. 2 is an elevational view of the back of the shield as it would be seen by a rider seated on the bicycle, the shield being shown mounted on the handle bar.

FIG. 3 is a sectional view taken on the line 3—3 in FIG. 2.

FIG. 4 is a fragmentary sectional view somewhat similar to FIG. 3 but showing a modification.

Referring now more particularly to the drawing, and especially to FIGS. 1-3 thereof, the protective windshield of my invention is generally designated by the reference numeral 10 is shown mounted on the handle bar 12 of a bicycle 14.

The bicycle here shown is of the general type or style popularly known as a "Sting-Ray" bicycle distinguished by the shape of the handle bar 12. However, it will be understood that the windshield of my invention is not necessarily limited to use on this particular style of bicycle.

The handle bar 12 as shown in FIG. 2 has a mid-portion 16 which includes a horizontal center bar 18 mounted on the upper end of the steering column 20 for the front wheel 22. Integral generally outwardly flaring bar portions 24 extend upwardly from the opposite ends of the center bar 18 and terminate in rearwardly and outwardly flaring integral hand grip portions 26 which in this instance are shown as covered with tubular hand grips 28 of rubber or a similar elastomeric material. The handle bar 12 is preferably of the integral tubular construction shown.

The protective windshield 10 is shown as a relatively thin sheet of transparent material of limited flexibility such as Plexiglas. The material of the shield should be tough and resistant to impact in order to protect the rider from flying objects as well as from the effects of a fall, and at least the upper central portion of the shield should be transparent for maximum visibility, as more fully described hereinafter.

The shield is of integral construction and includes a central main body portion 30 having the upper part 32 and the lower part 34. The shield also includes the laterally extending portions 36 and 38.

Clamps 40 are provided for mounting the shield on the handle bar. The clamps 40 are preferably in the form of metal straps or brackets on the back side of the shield having straight bar portions 42 extending away from the shield in a generally rearward direction and substantially normal thereto, being provided with integral foot or mounting portions 44 which are preferably permanently secured to the shield as by the rivets 46. The rear ends of the brackets are return-bent as at 47 in an arc conforming to the diameter of the handle bar so as to loop around the handle bar as best shown in FIG. 3 and to be bolted thereto by the nut and bolt assemblies 48.

The clamps are arranged in the outline of the handle bar so that when secured to the handle bar as shown in FIG. 2 the shield is mounted at the front side of the handle bar in spaced relation thereto. The lower edge of the shield, including its lower central part 34 and the lateral extensions 36 and 38 is preferably contoured to match the outline of the handle bar so that the entire front of the handle bar is protected by the shield. The central main body portion 30 of the shield extends from the handle bar up to a level above the head level of a rider sitting on the seat 50 of the bicycle. Preferably the straight bar portions 42 of the clamps are of increasing length from the center post 20 of the bicycle out to the hand grip portions 26 of the handle bar to space the lateral portions 36 and 38 of the shield far enough forward in relation to the hand grip portions 26 of the handle bar as to fully protect the hands of a rider in case of a fall. In other words, those clamps attached to the hand grip portions would preferably be longer than those upper clamps attached to the bar portions 24 which in turn would preferably be longer than the lower clamps attached to the bar portions 24.

The upper part of the central main body portion 30 of the shield is transparent as indicated at 32 so as to provide maximum visibility. The lower part 34 of the central portion as well as the lateral portions 36 and 38 (actually all that surface below the line 52) is treated by being covered on the rear side with a luminescent material or a material of a nature and character to reflect the lights of an approaching vehicle, or both. Thus, the area beneath the line 52 may be covered with a coating 53 of paint having fine particles of metal or other material capable of reflecting light mixed into the paint so that the entire area beneath the line 52 will glow at night when facing the headlights of an oncoming vehicle. Alternatively, the area beneath line 52 may be covered with a coating 53 of a luminescent paint which will give off its own light. Suitable phosphors may be added to the paint to give it the quality of luminescense or phosphorescense. Of course, the paint may if desired have both qualities, that of luminescense and reflecting light.

FIG. 4 shows a modification in which the shield is formed of two laminations 60 and 62 of a transparent material such as Plexiglas, in other words, the same material as in shield 10 shown in FIGS. 1 and 3. The same area of the shield, that is the area below line 52, may be reflectorized and/or made luminescent but in this instance by the presence of a sheet of material 64 sandwiched between the laminations 60 and 62 and having fine particles of metal or other light reflecting material and/or luminescent material such as suitable phosphors. The sheet 64 may be opaque, or it may be transparent or translucent and thus provide for some visibility. Whether transparent or not, the main purpose of the sheet 64 is to carry the material needed to reflectorize that portion of the shield and/or to make it luminescent. Referring back to FIGS. 1-3, the coating 53 on the back of the shield could be replaced by the sheet 64 adhered thereto. On the other hand, the sheet 64 between laminations of the shield in FIG. 4 could be replaced by the coating 53 applied to the inner surface of one of the laminations.

Preferably, in both embodiments disclosed the entire margin of the shield is rimmed by a channel or U-shaped bead 66 to protect the edges.

WHAT I CLAIM AS MY INVENTION IS:

1. A protective windshield for a bicycle or the like, said shield being in the form of a relatively thin sheet of material of limited flexibility clamps for removably mountings said shield on the front of the handle bar of the bicycle, said shield having a central main body portion extending from the mid-portion of the handle bar up above the head level of a rider seated on the bicycle, said shield also having laterally extending portions extending along and protecting the hand grip portions of the handle bar, the material of said shield being tough and resistant to impact and the upper part of said body portion being transparent, said sheet of material forming said shield being composed of transparent laminations and the lower part of said body portion having luminescent material between said laminations.

2. A protective windshield for a bicycle or the like, said shield being in the form of a relatively thin sheet of material of limited flexibility, clamps for removably mounting said shield on the front of the handle bar of the bicycle, said shield having a central main body portion extending from the mid-portion of the handle bar up above the head level of a rider seated on the bicycle, said shield also having laterally extending portions extending along and protecting the hand grip portions of the handle bar, the material of said shield being tough and resistant to impact and the upper part of said body portion being transparent, said shield being adapted to cover the front of the entire handle bar, and said clamps being secured to the body and laterally extending portions of said shield and adapted to be removably attached to said handle bar, those clamps secured to said laterally extending portions being of greater length than those secured to said body portion to space said laterally extending portions from the hand grip portions of the handle bar far enough to protect the hands of the rider in the event of a fall.

3. The shield defined in claim 2, wherein said clamps are brackets having return-bent ends adapted to be looped around the handle bar and attached thereto.

4. The shield defined in claim 2, wherein said laterally extending portions and the lower part of said body portion are treated so as to be luminescent.

5. The shield defined in claim 3, wherein said laterally extending portions and the lower part of said body portion are treated so as to reflect the lights of an approaching vehicle.

6. The shield defined in claim 5, wherein the lower edges of said shield are contoured to match the handle bar.

7. The shield defined in claim 6, wherein said shield is made of Plexiglas.

8. A protective windshield for a bicycle or the like, said shield being in the form of a relatively thin sheet of material of limited flexibility, clamps for removably mounting said shield on the front of the handle bar of the bicycle, said shield having a central main body portion extending from the mid-portion of the handle bar up above the head level of a rider seated on the bicycle, said shield also having laterally extending portions extending along and protecting the hand grip portions of the handle bar, the material of said shield being tough and resistant to impact and the upper part of said body portion being transparent, said shield being adapted to cover the front of the entire handle bar, and said clamps being secured to the body and laterally extending portions of said shield and adapted to be removably attached to said handle bar, those clamps secured to said laterally extending portions being of sufficient length to space said laterally extending portions from the hand grip portions of the handle bar far enough to permit the rider to firmly grip the hand grip portions of the handle bar and also to protect the hands of the rider in the event of a fall.

* * * * *